United States Patent Office 3,613,452
Patented Oct. 19, 1971

3,613,452
CONTROL APPARATUS
Edward G. Zoerb, Bloomington, Minn., assignor to
Honeywell Inc., Minneapolis, Minn.
Filed June 30, 1965, Ser. No. 469,972
Int. Cl. G01k 11/22
U.S. Cl. 73—339 A                                4 Claims

ABSTRACT OF THE DISCLOSURE

An improved temperature sensitive acoustical fluidic oscillator whose frequency of oscillation and response time depend upon a specially shaped chamber and a specially located exhaust passage together with a system for utilizing the fluidic oscillator output comprising apparatus for converting an oscillating fluid signal into an analog output signal.

This invention relates to a temperature sensing apparatus and more specifically to a fluid temperature sensing device and control system.

A temperature sensor is an instrument that uses a physical phenomenon to provide a measure of temperature. Temperature sensors of the mechanical or electrical type are well known in the art. An example of the mechanical type of temperature sensor is the common household thermometer that employs a bimetal strip for sensing temperature. An example of the electrical type of temperature sensor is the thermocouple which generates a voltage in accordance with the temperature of the point of contact of two different metals. Temperature sensors of the mechanical and electrical types mentioned have been widely used to sense temperature of fluids where a fast time response is not required of the temperature sensor.

With the advent of a new fluid technology that uses the principle of fluid dynamics for purposes of sensing, monitoring, metering and moment producing functions a need has developed for fluid devices that have thermal response characteristics suitable for use in closed loop fluid circuits. Although in certain instances electrical-mechanical components can perform equivalent sensing functions as fluid components, in most cases, where cost and simplicity are factors, it is desirable to have a system which utilizes only fluid components. One such fluid device necessary for closed loop temperature control systems is a temperature sensor.

There are devices which will function as temperature sensors, such as the fluid oscillator of Warren 3,016,066. However, oscillators of this type are unacceptable for use in closed loop engine control systems because of their slow response time. Applicant has invented a device that does have the required time response and in fact has a time response faster than the aforementioned thermocouple. The applicant's invention has particular utility in fluid closed loop control systems for turbojet engines. The invention also has application as a temperature sensor for a conventional closed loop control system to overcome inherent time response problems caused by the use of temperature sensors such as thermocouples. Applicant's invention need not be used in a system but can be used for measuring temperature of a fluid similar to a thermometer.

One of the reasons for the fast time response for applicant's fluid temperature sensor in a high temperature range over conventional types, such as thermocouples, is that thermocouples must be massive to withstand high temperature environment for any length of time and consequently have a considerable thermal lag, whereas in the fluid temperature sensor the primary determinant of response speed is the fluid flow rate. In other words, the temperature sensor is capable of measuring the temperature of the fluid immediately when the fluid is introduced in the temperature sensor rather than requiring heating of a secondary object to determine the temperature effects upon it.

Basically the fluid temperature sensor is a fluid oscillator. Positive feedback is obtained through shaped chambers and an oscillator output is obtained from a pickoff in one of the chambers. The positive feedback propagation occurs at the speed of sound, and it is this characteristic which is used in making this particular oscillator into a temperature sensor.

The temperature sensor is illustrated in a closed loop engine control system. The closed loop system includes the temperature sensor and apparatus for activating a fuel shutoff valve when the output of the temperature sensor reaches a predetermined frequency of oscillation.

The functioning of applicant's invention will become apparent from the following description along with the drawing, in which.

Figure 1:
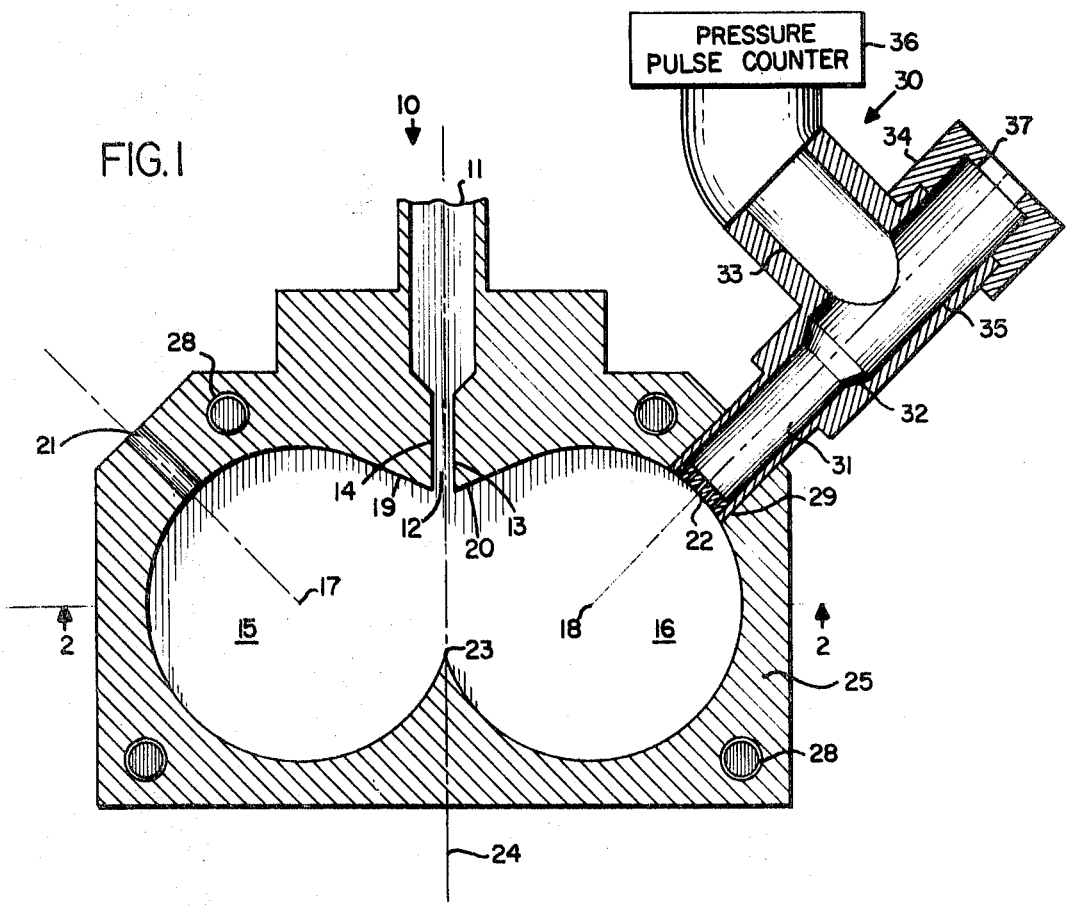
FIG. 1 is a cross-sectional view of the temperature sensor.

Referring now to FIG. 1, reference numeral 10 generally designates a pure fluid temperature sensor, and reference numeral 30 generally designates a pressure pickoff for temperature sensor 10. A hollowed out plate 25 defines the outer radial boundaries for a first cylindrical chamber 15 and a second cylindrical chamber 16. Although cylindrical chambers are described other chamber shapes such as oblong, oval, and spherical chambers could be used. The chambers are referred to as two separate chambers but it is obvious that they may be considered as one substantially bilaterally symmetrical chamber. Further chambers need not be symmetrical as shown in FIG. 1, but could be of unequal size and shape.

Temperature sensor 10 has an ingress fluid passage 11 which connects to a fluid supply nozzle 12. Passage 11 is capable of directing a fluid stream into nozzle 12 when connected to a fluid power source. Along the sides of nozzle 12 are located a first plane surface 13 and a second plane surface 14.

A splitter 23 is formed in housing means 25 by the intersection of chambers 15 and 16. Splitter 23 is substantially aligned with nozzle 12 so that the fluid stream emanating from nozzle 12 impinges on splitter 23. An approximate axis of symmetry of the temperature sensor, which passes through splitter 23, is denoted by reference numeral 24.

Reference numerals 17 and 18 approximately denote the centers of chambers 15 and 16, respectively.

Two exit passages 21 and 29 are provided to allow the fluid, which enters through nozzle 12, to exhaust out of temperature sensor 10.

Chambers 15 and 16 are provided with reentrant walls or shields 19 and 20 which form acute dihedral angles with plane surfaces 14 and 13, all respectively. Exit passage 29 has a pressure pickoff 30 fastened thereto. Located in pressure pickoff 30 are a series of small circular passages 22, which act as a resistance means to fluid flow into an exit passage 31. Exit passage 31 is connected to a further exit passage 35 by a diffuser section 32. A fluid conduit 33 is attached to exit passage 35 to allow entrainment of fluid in conduit 33 by the fluid stream flowing in exit passage 35. Attached to pickoff 30 is a pressure pulse counter 36, which is employed to count the number of pressure pulses in fluid conduit 33. For example, a dynamic pressure transducer attached to pickoff 30 would be suitable for measuring the pressure pulse propagation of conduit 33. An oscilloscope or frequency meter could be connected to the transducer to give a visual indication of frequency of oscillation and correspondingly the temperature. Since only pulses are to be counted it is not necessary that the pressure transducer is attached directly to the pickoff.

Located on pickoff 30 is a resistance or ridge 37, which offers resistance to the fluid flowing out through conduit 35. This ridge 37 renders the output signal in passage 33 substantially insensitive to fluctuations in supply pressure.

Figure 2:
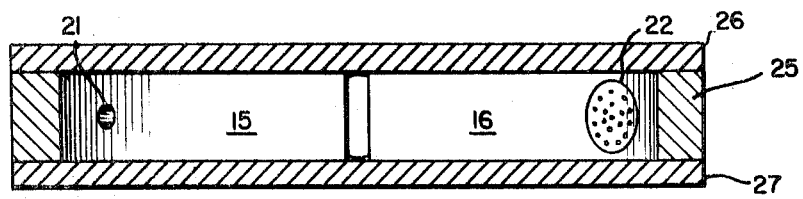
FIG. 2 is a cross-sectional view of the sensor along line 2—2 of FIG. 1.

Referring to FIG. 1 and FIG. 2 a top plate 26 and a bottom plate 27 are fastened to plate 27 by suitable means such as screws 28, the plates thereby enclosing chambers 15 and 16 on the top and bottom, and thus completing housing 25 for the temperature sensor.

In order to fully understand the operation of the invention it is necessary to distinguish between two physical phenomena, namely, the flow field and the pressure field. Ordinarily one assumes that the pressure field, which is the path a pressure wave travels, follows directly on the flow field, which is the path or streamline a fluid particle follows. However, a pressure pulses travel in a fluid in all directions at a speed determined by the composition of the medium and its absolute temperature. For example with air at room temperature a pressure pulse travels at a speed of approximately 1100 feet per second.

A pressure pulse created by a disturbance travels outwardly at 1100 feet per second in a manner similar to ripples generated by throwing a rock into a pool of water. Since the pressure pulses travel at the speed of sound in the fluid medium it is apparent that a pressure pulse can propagate upstream on a fluid stream as well as downstream. In other words, the pressure pulses may travel opposite to the fluid motion provided the fluid velocity does not exceed the local speed of sound.

In the applicant's invention fluid enters ingress fluid passage 11 and flows into nozzle 12. The fluid emerges from nozzle 12 in a continuous stream and impinges on splitter 23. Upon impinging upon splitter 23 the fluid stream is separated and flows into chambers 15 and 16. The fluid swirls around the periphery of chamber 15 and exhausts out passage 21, however, only a small secondary flow continues around the chamber past passage 21 which results in a vortex flow pattern within chamber 15. Similarly, fluid that enters chamber 16 swirls around the periphery of chamber 16 and exhausts out exit passage 29. This continual supply of new fluid to chambers 15 and 16 and exhausting of old fluid results in the temperature sensor having a fast time response.

Passages 22 in exit passage 25 need not be circular but may be square, tapered, or any other shape which offers resistance to fluid flow. The resistance to fluid flow caused by passages 22 is a result of the viscous dissipation of energy due to adherence of the fluid particles to the walls of the passages. That is, along every surface with a moving fluid adjacent to it the local velocity must be zero at the surface.

Upon exhausting from passages 22 the fluid flows into exit passage 31 and from passage 31 to diffuser 32, and then into passage 35. It will be noted that diffuser 32 has a rapid cross-sectional area expansion to cause fluid flowing in exit passage 31 to separate from the outer periphery of diffuser 32. As a result of the separation of the fluid stream from the walls of passage 32 entrainment of fluid from fluid conduit 33 occurs. The entrainment is caused by the viscous shear forces acting along the edge of the high velocity fluid stream within the passage 35. The viscous forces cause some of the quiescent fluid in conduit 33 to be captured by the fluid stream and accelerated up to the fluid stream velocity at the expense of the energy of the fluid stream.

The removal of fluid in conduit 33 by entrainment or viscous pumping action causes the pressure to decrease locally within conduit 33, which results in a secondary fluid flow in conduit 33 and counter 36 toward the fluid stream in passage 35. This serves to keep the hot fluid from passage 29 from entering passage 33 and affecting the output counter.

In other words, the flow field in the temperature sensor 10 consists of the streamlines of fluid path lines generated as the fluid enters through nozzle 12 and passes around the periphery of chambers 15 and 16 and out exit passages 21 and 29 respectively. From exit passage 29 the fluid flows outward through pressure pickoff 30 and exhausts out of exit passage 35.

The foregoing explanation of the flow field in the temperature sensor 10, however, pertains to only half of the explanation of the theory of operation of the device. In addition, a pressure field is superimposed upon the flow field.

As the fluid flows from nozzle 12 and impinges on splitter 23, the fluid stream is set into oscillation about splitter 23. One of the reasons causing the oscillation of the fluid stream is a feedback pressure pulse that is generated at splitter 23. As the fluid stream impinges on the splitter 23 a pressure pulse is emitted which travels radially outward and a portion of the pressure pulse is reflected from the cavity walls into the fluid stream. Hence, the pulse is called a feedback pulse. The time required of the pulse to travel from the splitter to the chamber walls and back to the fluid stream is directly proportional to the velocity of the pulse. It will be recalled that the pulse travels at a constant velocity in a given fluid medium at a given temperature. With an increase in temperature the pressure pulse propagates around the internal feedback path in less time and consequently switch the fluid stream sooner. In other words, the faster the pulse propagates the the faster the fluid stream oscillates across splitter 23.

Thus, when the temperature of the fluid stream passing through the chamber of the temperature sensor increases there is a corresponding increase in the rate at which pressure pulses are emitted by the fluid stream. Conversely as the fluid temperature decreases the frequency of oscillation of the fluid stream decreases. Since the frequency of oscillation of the fluid stream is proportional to temperature, the temperature of the fluid may be measured by counting the pressure pulses emitted from the fluid stream. For actual counting of the pulses a pressure pulse counter 36 may be used or a fluid bistable amplifier may be connected to pressure pickoff 30. The temperature sensor may also be used in a closed loop control system and the output pressure pulse fed into the hardware shown in FIG. 3, which replaces the pressure pulse counter 36 shown in FIG. 1.

As stated previously a portion of the pressure pulse energy is reflected to achieve the feedback effect necessary for switching the fluid stream. Another portion of the pressure pulse energy exhausts out exit passages 21 and 29 and must travel through small circular passages 22. These passages pass the pressure pulse virtually unimpeded therethrough. The energizing pulse travels on the flow field and in the same direction as the fluid stream is flowing into exit passages 31 and 35. However, it will be recalled that fluid was entrained from fluid conduit 33 resulting in a secondary fluid flow from fluid conduit 33 into exit passage 35. As the pulse passes through fluid conduit 35 it will disperse a portion of the pulse energy into fluid conduit 33 in opposition to direction of the secondary flow in fluid conduit 33. In other words, although fluid is flowing from conduit 33 into exit passage 35 the pressure pulse will propagate from exit passage 35 upstream into fluid conduit 33. Thus a coupling or passage for the fluid pressure pulses has been achieved by employing the principle of acoustic radiation. Hence the pressure pickoff 30 may be termed a coupling or fluid coupler element.

At the junction of fluid conduit 33 and exit passage 35 it will be noted that the temperature of the fluid stream exhausting from the temperature sensor 10 may not be at the same temperature as the fluid entrained from conduit 33. Indeed, applicant desires the temperature of the fluid in conduit 33 to be constant while the temperature of the main fluid stream is variable. The effect of the entrainment of fluid from passage 33 is to isolate the fluid stream from the pulse counter and thereby eliminate any thermal effects on the pressure pulse counter 36. Consequently, the upper limit of temperature which the temperature sensor is capable of sensing, is dependent only upon the material used to fabricate the temperature sensor. Thus, for example, a temperature of 3000° F. could be sensed by the temperature sensor and the means used to measure the frequency of oscillation of the fluid stream could be at room temperature of 70° F. This obviously means the temperature sensor does not require an elaborate temperature resistant counter to measure the frequency of oscillation of the fluid stream.

If the geometry of cavities 15 and 16 is kept constant the frequency of oscillation of the fluid jet around splitter 23 will be constant at a given temperature. However, by adjusting the cavity sizes, i.e., making them larger or smaller the frequency of oscillation at a given temperature can be increased or decreased. For example, if the cavities 15 and 16 were increased in diameter, or extended in an oblong manner the frequency of oscilaltion of the fluid stream across splitter 23 would decrease. The decrease would be caused by the greater time interval required for a feedback pulse to propagate from splitter 23 to the chamber wall and back to the fluid stream emanating from power nozzle 12. Thus, it is obvious that applicant can alter the frequency output of this device at a given temperature by merely increasing or decreasing the chambers or cavities 15 and 16.

Figure 3:
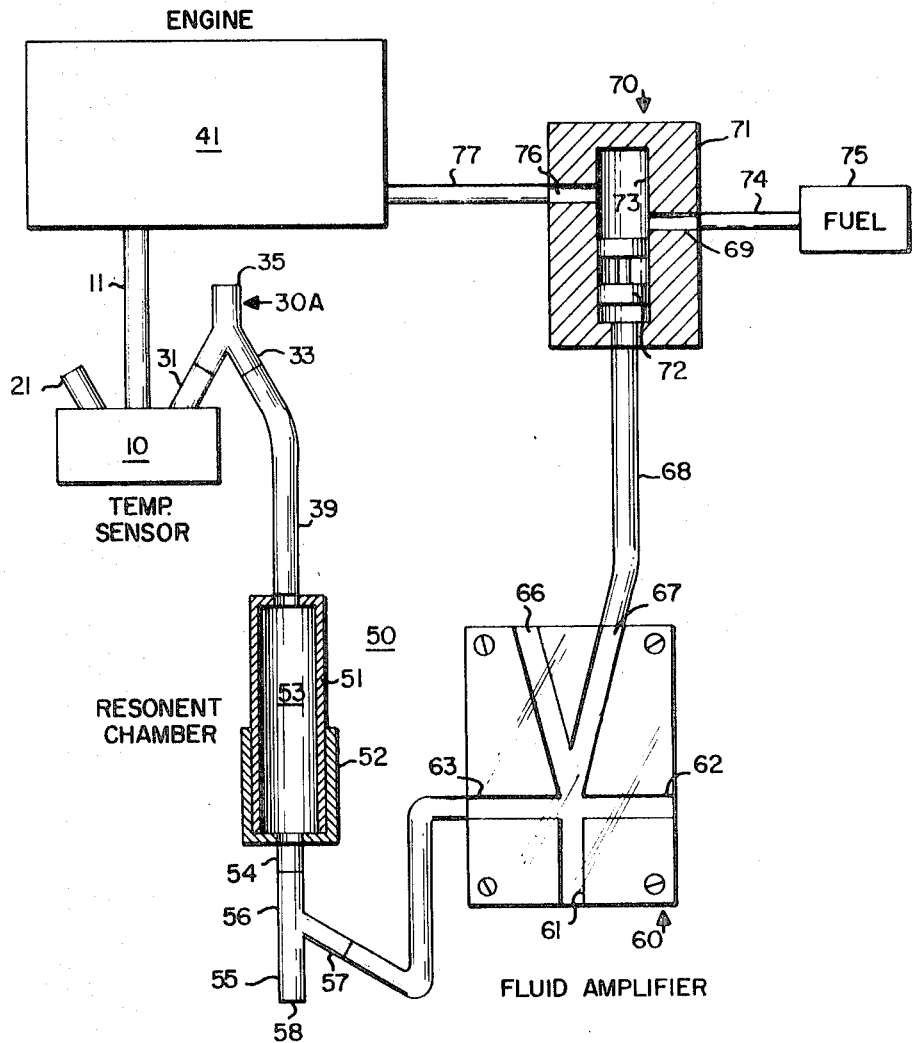
FIG. 3 is a schematic showing, partly in section, of a closed loop temperature control system.

FIG. 3 generally depicts an engine temperature limiting system. Operation of the engine normally produces a supply of gas at an elevated temperature: increase of that temperature beyond a predetermined point is premonitory of engine failure, and accordingly results in shutting off the supply of fuel to the engine. The gas temperature is sensed by tapping off a small portion of the gas and supplying it to applicant's temperature sensor: the resulting pressure pulse train is used to control the fuel valve. It will be obvious, however, that applicant's sensor may be used in any closed or open loop system where the temperature of an available fluid is a parameter of the desired control or indicated function.

In FIG. 3 a jet engine is shown at 41, and temperature sensor 10 is connecting passage 11 to the turbine inlet area of the engine. Passage 11 is so short that no appreciable gas temperature change occurs in it. Passage 31 is connected to a coupler 30A generally like coupler 30 in FIG. 1 except that branch 33 enters the coupler at an acute angle rather than at a right angle. It should be pointed out that coupler 30A need not have an acute branch but could have a right angle branch. Branch 33 is connected through a conduit 39, an adjustable resonance chamber 53 having relatively movable portions 51 and 52, and a conduit 54 to a further coupler 55 having an inlet 58 to which fluid at normal temperature is continuously supplied, and a branch 57.

Also shown in FIG. 3 is a fluid amplifier 60 including an inlet passage 61, a pair of control ports 62 and 63, and a pair of receiver legs 66 and 67. Power fluid is continuously supplied to passage 61, and control passage 63 is connected to branch 57 of coupler 55. Outlet passage 67 is connected by a conduit 68 to a metering valve 70 including a housing 71 and a cylindrical cavity 73 in which a spool 72 is free to slide. Valve 70 has an inlet passage 69 connected by a conduit 74, to a fuel supply, and an outlet passage 76 connected by a conduit 77 to engine 41 to supply fuel thereto. When spool 72 is in the position shown, fuel may flow freely through the valve: when the spool is at the upper end of the cavity, the flow of fuel through the valve is cut off.

In normal operation fluid is supplied to temperature sensor 10 through passage 11 from engine means 41. Fluid exhausts through passages 21 and 31 from the temperature sensor. Fluid is entrained from conduit 33 as shown in FIG. 3 in the same manner as fluid is entrained from conduit 33 as described in conjunction with FIG. 1. Consequently, the hot gas or hot fluid that enters the temperature sensor passage 11 exhausts through exit passage 35, while pressure pulses are coupled through conduit 39 to resonance means 53. The length of chamber 53 can be increased or decreased by adjusting elements 51 and 52. When the tube length is one-half the distance traveled by a pressure pulse in the interval between pulses, resonance occurs in the tube because the acoustical wave reflected from the flat end of the tube is reinforced by the oncoming wave. At resonance a gain across the resonance chamber 51 is exhibited while at an off-resonance condition a signal attenuation of the pressure pulses propagating through chamber 53 occurs.

In order to minimize temperature effects on resonance chamber 53, conduit 39 should be made out of a material with a low thermal coefficient of thermal conductivity. Although heat is not converted through the fluid, the conduit or means connecting coupler 30 to resonance chamber 50 is capable of conducting heat, which would affect the acoustical resonance tube. Consequently, it is desired to isolate the resonance chamber from the coupler by use of a material that has a low thermal conductivity.

Coupler 30A serves three functions: it allows the temperature sensor to run unloaded, it allows the frequency signal taken off of the temperature sensor to have a zero DC level, and consequently not bias a subsequent stage of amplification, and it also provides a low flow condition for the resonance tube so that the temperature and consequently the acoustical velocity within the resonance chamber are a function of ambient conditions only and not sensor temperature.

Thus, under normal conditions a pressure pulse will propagate from the temperature sensor 10 into the fluid conduit 33 into coupling means 39 and into resonance chamber 53. When the frequency of oscillation of the pulses entering chamber 53 approaches a resonance condition the amplitude of the pressure pulse will increase as it goes through resonance chamber 53. For example, a pressure pulse entering resonance chamber 53 may have a peak to peak amplitude of .5 p.s.i. but upon exhausting into exit means 54 may have a peak to peak amplitude of 1 p.s.i.

Thus, pressure pulses propagate into resonance chamber 53 through conduit 39 and exhaust into conduit 54 and into a second coupler 55. In fluid coupler 55 pressure pulses propagate up conduit 57 and into fluid amplifier 60.

In normal operation fluid amplifier 60 receives pressure pulse signals through control port 63. A fluid output signal is generated in receiver leg 67 to activate spool 72, which is directly proportional to the number and strength of pressure pulses applied at control port 63. That is, pressure pulses of sufficient energy must be maintained at control port 63 to obtain a useful output signal at receiver leg 67.

If positive pressure pulses of sufficient energy are supplied to control port 63 the fluid jet switches from receiver leg 66 to receiver leg 67. The fluid amplifier receives such positive pressure pulses when resonance chamber 50 is in resonance.

In normal operation pressure pulses are generated in the temperature sensor and propagate through coupler 35 into conductive means 39 and resonance chamber 53. From resonance chamber 53 the pressure pulses pass into coupler 55 and into control port 63 of fluid amplifier 60. When the resonance chamber 50 is at a condition of resonance the pressure pulses are amplified and consequently have a greater pulse energy or momentum so that the pressure pulses exhausting into receiver 54, and consequently propagating into control means 63, will be of sufficient energy to switch the fluid stream in fluid amplifier from leg 66 to leg 67. However, when the resonance chamber is not at a resonance condition, the pressure pulse propagated from resonance chamber 53 is of insufficient energy to switch the fluid jet from receiver leg 66 to receiver leg 67.

The fluid jet when switched into receiver leg 67 travels down conduit 68 into valve 70. The metering valve 70 functions to limit the amount of fuel available to the engine 41. When a signal activates the metering valve 70 the spool 72 will travel to the top portion of output means 76 of the metering valve 70. The spool 72 is activated by a pressure signal in connecting conduit 68. The increase of pressure on the lower portion of the spool 72 causes the spool to travel upward to the top of chamber 73 and consequently shut off the flow of fuel to the engine 41.

In summary, a fluid temperature signal is generated in the temperature sensor 10 which is proportional to the turbine inlet temperature of the engine 41. The pressure signal exhausting from the temperature sensor 10 is in the form of a train of pressure pulses which propagate down conduit 39 into resonance chamber 53 and consequently into coupler 55. When the resonance chamber is not at resonance the pulse train propagates up control port 63 but is of insufficient strength to switch the fluid jet from output leg 66 to output leg 67. Hence, the fuel flowing from fuel supply tank 75 through metering valve 70 will be unimpeded and continue to power the engine. However, if the engine exceeds its maximum safe operating temperature the frequency of the pulse timer generated in the temperature sensor becomes that to which resonance chamber 53 is resonant. Consequently, the pressure pulse output from the resonance chamber is of sufficient strength to switch the output of fluid amplifier 60 from receiver 66 to receiver 67. Pressure builds up in conduit 68, which activates valve 70 to shut off the fuel to the engine 41. With the fuel supply shut off or lessened to the engine, the engine temperature goes down since there is no combustion process in the engine. if the present temperature control system was not used the engine could overheat and consequently destroy itself through excessive temperatures in the engine. With the applicant's invention, however, this problem is eliminated since the temperature of the engine is limited by controlling the amount of fuel available to the engine.

Once the temperature of the system goes down, and the fluid resonant chamber is no longer at resonance, the pressure pulse will be of insufficient energy to maintain the fluid stream from nozzle 61 directed at receiver 67. Consequently, the fluid stream will flow directly out receiver leg 66 causing a lower pressure in leg 67, which results in spool 72 sliding downward to allow fuel to flow to the engine.

It will be obvious to those skilled in the art that applicant further need not use a metering valve connected to the engine 41. Instead applicant may use fuel in the fluid amplifier which directly shuts off the fuel to the engine when a pulse is generated in the fluid amplifier.

It can be appreciated that the applicant may use an oscillating device other than a temperature sensor, with this system. For example a sensing device having an oscillating fluid output could be connected in applicant's system to monitor a different variable, such as pressure.

While I have shown and described specific embodiments of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:

1. A fluid temperature sensor comprising:
housing means;
a chamber located in said housing means, said chamber being substantially bilaterally symmetrical with respect to an axis;
a supply nozzle located in communication with said chamber, and aligned with said axis;
a splitter element positioned within said chamber, said splitter element being spaced from said nozzle and substantially aligned with said axis;
a first exit passage located in said housing means in communication with said chamber and inclined with respect to said axis so that said supply nozzle and said first exit passage form an acute angle therebetween;
a second exit passage located in said housing means in communication with said chamber and inclined with respect to said axis so that said supply nozzle and said second exit passage form an acute angle therebetween; and
pressure pulse responsive pickoff means in communication with said first exit passage.

2. A fluid temperature sensor comprising:
housing means;
a chamber located in said housing means;
a supply nozzle in communication with said chamber, said supply nozzle defining an axis;
re-entrant shields located adjacent said supply nozzle;
a splitter element positioned within said chamber, said splitter element being spaced from said nozzle and substantially aligned with said axis;
exit passage means located in said housing means in communication with said chamber so that said exit passage means and said supply nozzle form an aoute angle therebetween; and
pickoff means in communication with said exit passage means.

3. A fluid temperature sensor comprising:
housing means having a first and a second chamber located therein in communication with one another;
a fluid supply nozzle, said fluid supply nozzle defining an axis, forming substantially a line of symmetry between said first chamber and said second chamber;
said first and second chambers each having a shield portion located adjacent to said fluid supply nozzle;
a splitter located on said housing means and substantially aligned with said axis;
said first chamber and said second chamber having first and second output passages located therein, one of said output passages comprising a plurality of small circular ducts so as to reduced aerodynamic noise; and
pressure pulse responsive pickoff means including an exit passage downstream of and connected to said plurality of circular exit ducts, said exit passage having a rapid cross sectional area expansion so as to cause entrainment of fluid from an adjoining passage when fluid flows in said exit passage.

4. A temperature sensor comprising:
housing means having first and second chambers located therein in communication with one another, fluid supply means for directing a stream of fluid into said first and second chambers, a splitter located in said housing means at the intersection of said first chamber with said second chamber, first fluid exit means located in said first chamber, second fluid exit means located in said second chamber, and pickoff means connected to said second exit means, said pickoff means having a conduit with a rapid cross sectional area expansion, so as to cause entrainment of fluid from an adjoining conduit means when fluid flows in said pickoff means.

References Cited

UNITED STATES PATENTS

| | | | |
|---|---|---|---|
| 3,093,306 | 6/1963 | Warren | 235—161 |
| 3,158,166 | 11/1964 | Warren | 137—81.5 |
| 3,030,979 | 4/1962 | Reilly | 137—624.14 |

VERLIN R. PENDEGRASS, Primary Examiner

U.S. Cl. X.R.

73—357